Dec. 17, 1935.  A. J. MASLIN ET AL  2,024,739

RECTIFIER TRANSFORMER

Filed June 9, 1934  2 Sheets-Sheet 1

WITNESSES:
C.J. Welles.
S.A. Strickled

INVENTORS.
Albert J. Maslin,
Hans F. Fahnoe and
Harry E. Schaffer.
BY O.B. Buchanan
ATTORNEY Dec. 17, 1935.    A. J. MASLIN ET AL    2,024,739

RECTIFIER TRANSFORMER

Filed June 9, 1934    2 Sheets-Sheet 2

WITNESSES:

INVENTORS.
Albert J. Maslin,
Hans F. Fahnoe and
Harry E. Schaffer.
BY
ATTORNEY

Patented Dec. 17, 1935

2,024,739

UNITED STATES PATENT OFFICE 2,024,739

RECTIFIER TRANSFORMER

Albert J. Maslin, Hans F. Fahnoe, and Harry E. Schaffer, Sharon, Pa., assignors to Westinghouse Electric & Manufacturing Company, East Pittsburgh, Pa., a corporation of Pennsylvania Application June 9, 1934, Serial No. 729,834

5 Claims. (Cl. 175—363)

Our invention relates to a conversion system and particularly to a transformer arrangement for supplying current to a sectionalized vapor electric converter.

In the operation of sectionalized converters considerable difficulty has been experienced in securing proper parallel operation of the parallel sections.

It is an object of our invention to provide a transformer system which will automatically secure proper parallel operation of sectionalized converters.

In the operation of vapor electric converters of the sectionalized type, best operation has heretofore been obtained when each section was fed from a separate transformer, each of the transformers having the same ratio and regulation characteristics. However, this system is so expensive that it has not come into general use.

In transformers according to our invention, the primary winding is split up into a plurality of parallel sections, all of the sections being placed on a single transformer core. Closely associated with each of the parallel primary sections is a substantially independent secondary winding, each of these secondary windings being closely coupled to a section of the primary winding but loosely coupled with all of the other primary windings, as well as the secondary windings associated therewith.

One of the advantages of sectional rectifiers lies in the ability to operate at fractional capacity when one or more of the sections is disconnected for any reason. In order that such a fractional capacity converter be practically operative on a circuit with other sources of supply, and particularly when the other supply sources are on the same supply bus as the fractionally operative converter, it is desirable that the regulation characteristics of the converter should constantly be such that it will readily parallel without assuming an improper proportion of the total load.

When a sectionalized converter was connected to the heretofore known type of supply transformer and a section or sections was disabled the regulation characteristic of the partial converter remained that of the sound converter thus overloading the remaining section unless some auxiliary regulating equipment was used to change the regulation.

It is accordingly an object of our invention to provide a transformer having a regulation characteristic dependent upon the active sections of a sectionalized converter.

When a sectionalized converter is fed from a sectionalized transformer, a further advantage is possible by designing the individual converter sections for different capacities and connecting to a section of the transformer designed for corresponding capacity. This is of particular importance when it is desired to carry a fractional load at full load voltage regulation.

Other objects and advantages of our invention will be apparent from the following detailed description taken in conjunction with the accompanying drawings, in which.

Figure 1:
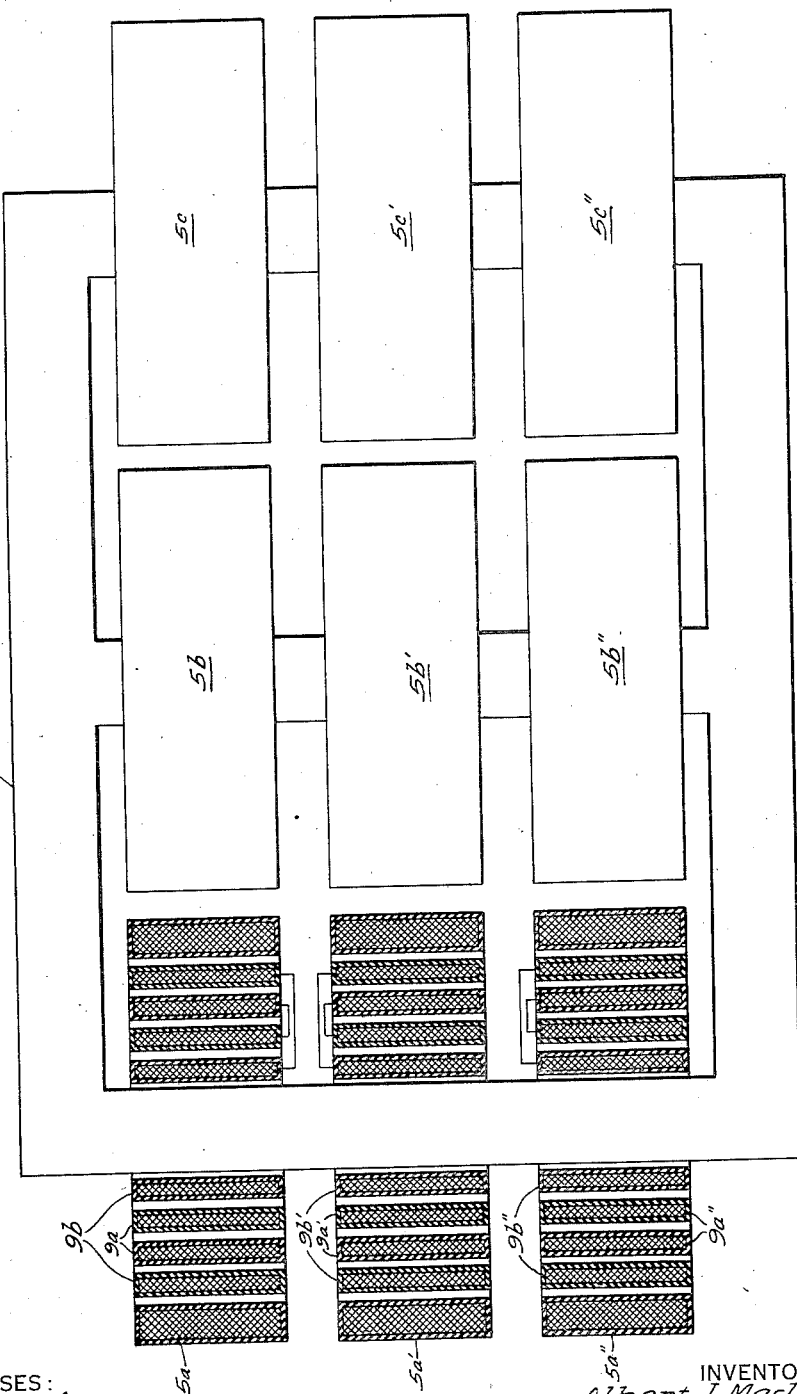
Figure 1 is an elevation partially in section of a transformer embodying our invention.

In the system according to our invention, the sections 1 of a sectionalized converter 2 are supplied by a suitable sectionalized transformer 3. The primary 4 of the transformer is divided into a plurality of parallel sections 5 preferably corresponding in number to the sections 1 of the sectionalized converter 2.

The sections 5 are connected in parallel and are connected simultaneously to the alternating-current supply system 7. Associated with each of the sections 5 of the primary winding 4 is a substantially independent secondary winding 9 illustrated as a double three-phase type. The phase terminals 10 of one of these secondaries are connected to the corresponding valves 11 of one of the sections 1 of the converter 2.

For convenience in illustration, we have shown a three-section converter 2 although in practice there are usually a larger number of sections 1. Also for convenience we have indicated the sections 1 as all of the same size or capacity although in practice, it is sometimes desirable to make the sections 1 of different capacity particularly where the converter 2 will be intentionally operated at fractional capacity to meet particular load requirements.

Figure 2:
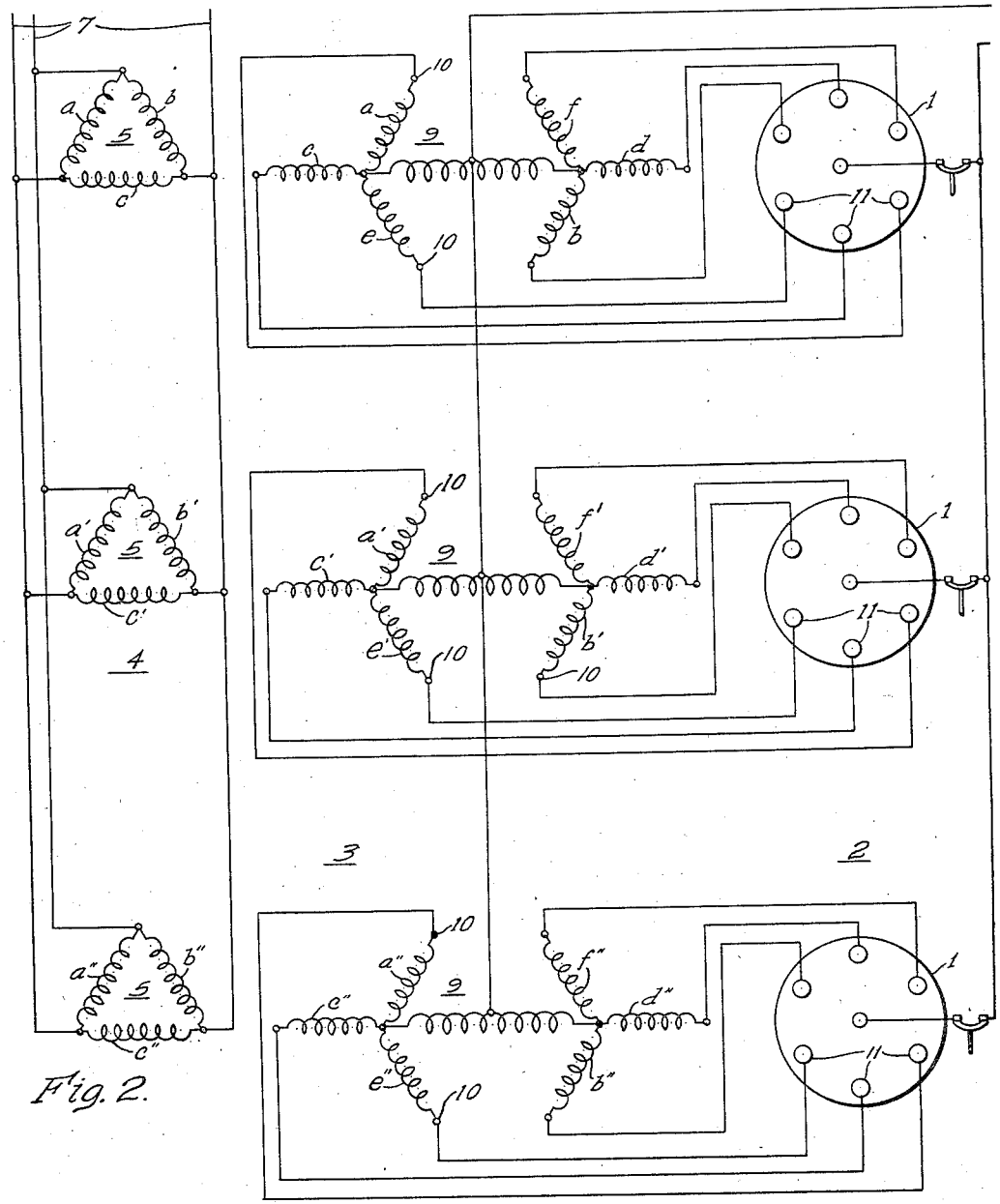
Fig. 2 is a schematic illustration of a rectifier system embodying our invention.

In the construction of our transformer, the parallel primary sections 5 have corresponding legs 5a, 5a', 5a'' wound on the same leg of a three-legged transformer core 16. Closely coupled with each phase winding of the primary sections 5 are two phase windings of the secondary system 9. Preferably the phase windings of the secondary system are split into two groups (see Fig. 2) and so positioned relative to each other and to the primary winding 5 that the induced voltage in each secondary phase 9a, 9b, 9c, 9d, etc., will be substantially equal. To accomplish this the windings are so related as to have substantially the same mean spacing between the transformer core 10 and the primary winding 5 and consequently, a substantially equal flux inter-leakage with the primary.

Each section 5, 9 of the parallel windings are connected in substantially the same manner, so that each parallel section is substantially independent of each of the other sections. The resulting transformer arrangement, therefore, has substantially the same operating characteristics as a plurality of independent transformers with the added advantage of a single magnetic core system and unitary electrical operation.

In the operation of our system, the converter sections are preferably mounted as shown in a copending application, Serial No. 589,414, filed January 28, 1932 by A. L. Atherton.

Figure 3:
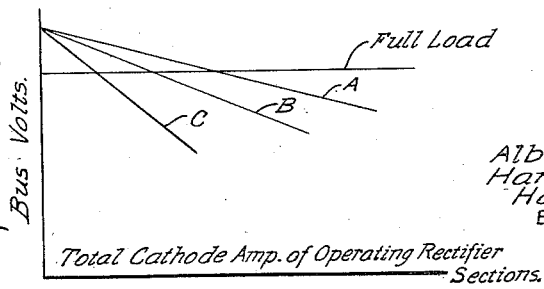
Fig. 3 is a graphical illustration of the regulation characteristics of our system.

Assuming all of the sections operative, the regulation of the converter and the supply transformer will be as shown at A in Fig. 3.

However, if any section is out of service either because of fault or because of disconnection, the transformer 3 according to our invention automatically reduces the regulation as shown at B, so that the fractional capacity converter 2 automatically assumes its proper proportion of the load without overloading the sections either of the converter or the transformer.

Likewise if two sections are inoperative, the regulation will be further reduced as shown at C.

The automatic regulation characteristic of our transformer system is not only useful for paralleling the converter with other sources of supply but is desirable when operating fractional loads at full voltage regulation. For this type of service a section, or sections 1, of the converter 2 is disconnected so that the active sections 1 operate at substantially full load.

While we have shown and described a specific embodiment of our invention, it will be apparent that changes and modifications can be made therein without departing from the true spirit of our invention and the scope of the appended claims.

We claim as our invention:

1. A supply transformer for a sectionalized vapor-electric converter comprising a primary having a plurality of parallel winding sections corresponding to the sections of the converter, a substantially independent secondary winding associated with each section of the primary winding, each of said secondaries supplying a section of the converter and independent interphase windings for controlling the method of operation of each of said secondaries.

2. A vapor-electric conversion system comprising a plurality of converter sections, a direct-current system connected to all of said converter sections, an alternating-current system, a transformer having a plurality of parallel primary and secondary winding sections, the number of transformer sections corresponding to the number of sections of the converter, the primary and secondary windings of each transformer section being closely coupled with respect to each other but loosely coupled with respect to every other section.

3. A conversion system comprising a polyphase alternating current system, a direct current system, a sectionalized vapor-electric converter for transferring energy between said systems, a transformer for connecting said converter to said systems comprising a core having a plurality of legs, a plurality of parallel windings on said legs adapted for connection to said alternating current system, a plurality of windings on said core, each of said windings adapted to be connected to the electrodes of a section of said converter, each of said second-mentioned windings being closely coupled with one of said first-mentioned windings, and loosely coupled with the remainder of said windings.

4. A transformer construction for supplying a sectionalized mercury arc rectifier comprising a primary winding having a plurality of parallel connected sections, a core member common to all of said sections, a plurality of secondary windings on said core, each of said secondary windings being closely coupled with one of the sections of the primary winding, said primary sections being so proportioned with respect to the converter sections that the regulation of the transformer is dependent on the total active sections of the converter.

5. A transformer system for supplying current to a sectionalized converter comprising a three legged transformer core, a plurality of independent three-phase primary windings on said core, said primary windings being connected in parallel, said primary windings being equal in number to the number of sections in the converter each phase winding of said primary being on a separate leg of said core, with corresponding phase windings of each primary winding being on the same leg of said core, a secondary winding closely coupled with each of said primary windings and loosely coupled with all the remaining windings, and independent interphase windings for controlling the operation of each of said secondary windings.

ALBERT J. MASLIN.
HANS F. FAHNOE.
HARRY E. SCHAFFER.